United States Patent [19]

Giacomini

[11] Patent Number: 5,305,790
[45] Date of Patent: Apr. 26, 1994

[54] BALL VALVE

[75] Inventor: Mario Giacomini, Boleto, Italy

[73] Assignee: Giacomini, S.p.A., Italy

[21] Appl. No.: 937,284

[22] Filed: Aug. 31, 1992

[30] Foreign Application Priority Data

Feb. 28, 1992 [IT] Italy ............................ MI92A-000444

[51] Int. Cl.$^5$ ............................................ F16K 47/02
[52] U.S. Cl. ................................. 137/599.2; 137/542
[58] Field of Search ............ 137/599.2, 614.17, 614.2, 137/269.5, 542

[56] References Cited

U.S. PATENT DOCUMENTS

| | | | |
|---|---|---|---|
| 1,185,333 | 5/1916 | Keltner | 137/269.5 |
| 2,399,300 | 4/1946 | Stewart et al. | 137/614.17 X |
| 2,898,935 | 8/1959 | Harris et al. | 137/599.2 |
| 4,932,436 | 6/1990 | Kanemaru | 137/614.17 X |

FOREIGN PATENT DOCUMENTS 292584 9/1966 Australia ........................ 137/599.2

*Primary Examiner*—Stephen M. Hepperle
*Attorney, Agent, or Firm*—Kirschstein, Ottinger, Israel & Schiffmiller

[57] ABSTRACT

A ball valve has two mutually orthogonal diametrical internal passages in one of which is mounted a pressure relief valve assembly for resisting sudden pressure flucutations in fluid flow during movement of the ball valve from an open to a closed position. The assembly has an adjustable biasing force to calibrate the valve.

7 Claims, 2 Drawing Sheets

BALL VALVE

BACKGROUND OF THE INVENTION

1. Field of the Invention

A ball valve consists of a valve body defining internally a chamber communicating with the outside through an inlet duct and an outlet duct and accommodating a ball which is pierced by a passage, the ball being rotatable from an open position in which the inlet and outlet ducts are brought into communication with each other to a closed position in which the ball interrupts the communication between the inlet and outlet ducts.

2. Description of Related Art

The use of ball valves to intercept a fluid in a pipe has been known for some time. The characteristic element of these valves is the fluid intercepting member which consists of a ball pierced by a cavity. The ball is movable from an open position, in which this cavity lies in the axis of an inlet pipe and an outlet pipe to permit the passage of a fluid, to a closed position to prevent the passage of the said fluid.

However, it has been observed that, when the ball is moved abruptly from the open position to the closed position, there are sudden pressure fluctuations caused by the movement of the ball (water hammer).

It has also been found that this type of valve, owing to its structure, is not capable of preventing sudden and high pressure increases in the inlet pipe from damaging gaskets and other elements disposed along the said pipe. The pressure increases may be caused, for example, by temperature rises or by rises in the rate of flow of the fluid.

These disadvantages have hitherto prevented a wider application of these valves, as for example in the "sprinkler" type of fire-fighting equipment, where the valves are used to discharge the water from the equipment. This fire-fighting equipment substantially consists of a water distribution network formed by a plurality of pipes. Sprinklers, each of which substantially consists of a nozzle closed by a plug, are disposed along the pipes. This plug consists, for example, of a glass shell filled with a fluid whose volume increases with a rise in temperature. As a result, in the event of fire, the increase in the volume of this fluid causes the plug to fracture and consequently the water can flow out of the pipe through the nozzle.

SUMMARY OF THE INVENTION

The object of the present invention is therefore to provide a ball valve capable of absorbing any pressure increases within a pipe without any damage being caused to the pipe itself or to the valve.

This object, which will be demonstrated more clearly in the course of the present description, is substantially attained by a ball valve with a hole which passes through the ball and is disposed transversely with respect to the passage and is provided at its ends with a first and a second seat, a safety valve being housed in the hole, with a bush of the safety valve housed in the first seat and defining with this seat an aperture for the passage of a fluid, the bush accommodating in a slidable way a valve stem provided with a head at its end facing the second seat, while a spring is interposed between the bush and the head.

BRIEF DESCRIPTION OF THE DRAWINGS

Further characteristics and advantages will be more clearly understood from the detailed description of an embodiment of a ball valve according to the present invention, provided below with reference to the attached drawings, provided for information only, in which.

DETAILED DESCRIPTION OF THE PREFERRED EMBODIMENTS

Figure 1:
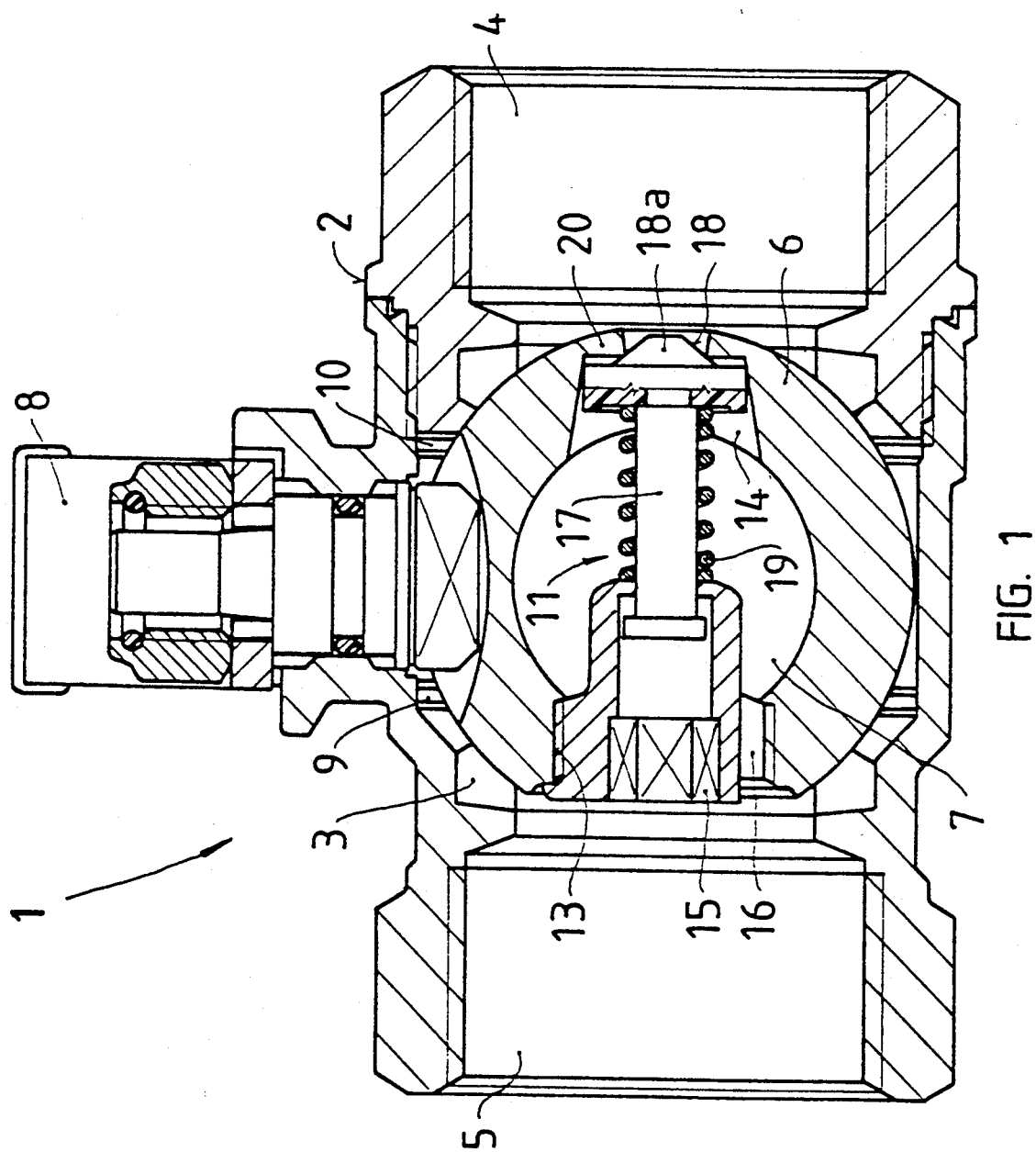
FIG. 1 is a view of an axial section of the ball valve according to the present invention in the closed position.
Figure 2:
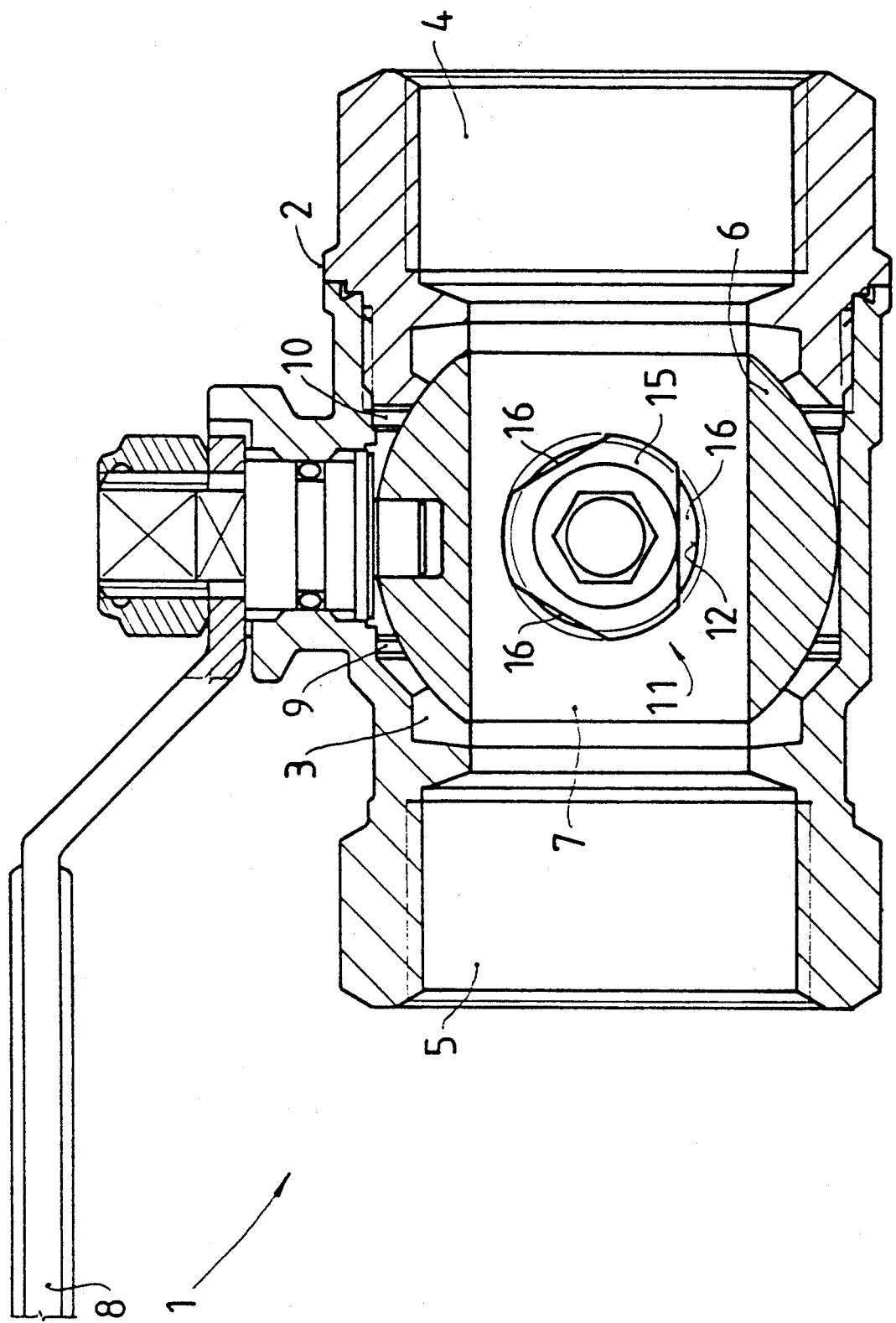
FIG. 2 shows the same section as in FIG. 1, but with the ball valve in the open position.

With reference to FIGS. 1 and 2, the reference number 1 indicates a ball valve with a safety device.

The valve consists of a valve body 2 having internally a chamber 3 communicating with the outside through an inlet duct 4 and an outlet duct 5. A ball 6 pierced by a passage 7 is housed inside the chamber 3. The ball 6 may be rotated by means of a servo motor or, as illustrated in FIG. 2, by a lever 8 from an open position (FIG. 2), in which the inlet and outlet ducts 4, 5 are put into communication with each other by the passage 7, to a closed position (FIG. 1), in which the ball interrupts the communication between the inlet and outlet ducts.

Two sealing gaskets 9, 10 are interposed between the internal surface of the valve body 2 and the external surface of the ball 6. These gaskets must be made from a material which provides a good seal between the gaskets and the ball, together with a low coefficient of friction to facilitate the rotation of the ball.

The valve 1 also comprises a safety valve 11 housed in a hole 12 formed in the ball 6 and disposed transversely with respect to the passage 7. A first and a second seat 13, 14 are formed at the ends of the hole 12. A bush 15 of the safety valve is screwed into the first seat 13. The bush is substantially triangular in section so that it defines three apertures 16 for the passage of a fluid between the first seat 13 and the bush itself.

Clearly, the transverse section of the bush may take the form of a polygon which may be inscribed within a circumference to define in this way a plurality of passages between the first seat and the bush.

A valve stem 17 is housed slidably in the bush 15. The valve stem is provided at its end facing the second seat 14, with a head 18 terminating in a frustoconical surface 18a. The head 18 is housed in the second seat 14. A spring 19 to press the frustoconical surface of the head 18 against a sealing rim 20 formed in the second seat is interposed between the bush 15 and the head 18.

Preferably, a helical pressure spring is used.

With reference to the attached FIGURES, the operation of the valve is as follows.

FIG. 2 shows the valve in the open position, in which state the passage 7 of the ball 6 is aligned respectively with the inlet duct 4 and the outlet duct 5. In this state, the fluid can pass freely through the valve body 2 from the inlet duct to the outlet duct.

By operating the lever 8, the ball is then rotated from the open position to the closed position shown in FIG. 1. In this new state, the ball prevents the passage of the fluid from the inlet duct 4 to the outlet duct 5.

However, it may happen that the pressure inside the inlet duct undergoes considerable fluctuations, sufficient to damage or fracture the pipes up-line from the valve. Such fluctuations may be caused when the valve is rotated abruptly from the open position to the closed position (water hammer) or by an excessive rise in temperature or in the fluid flow rate.

In such situations, the fluid exerts a pressure on the head 18 and overcomes the resistance of the spring 19, as a result of which the valve stem 17 is partially impelled backwards into the interior of the bush 15. Consequently, some of the fluid contained inside the inlet duct 4 can pass through the hole 11 and reach the outlet duct 5, this passage of fluid continuing until the pressure up-line from the valve returns to an acceptable level, as a result of which the head 18, under the pressure of the spring 19, recloses the second seat by pressing against the edge of the sealing rim 20 (as shown in FIG. 1).

It will be noted that in this position the frustoconical surface 18a is capable of ensuring an excellent seal with the edge in such a way as to prevent solid particles contained in the fluid from passing into the interior of the ball. In order to make the sealing action of the head against the rim more effective, the head 18 could be made from elastomeric material.

Finally, it will be noted that with the present invention it is possible to calibrate the valve in such a way that the head 18 is moved to permit the passage of fluid at different pressure values, in such a way as to adapt the valve to various requirements. Alternatively, it is possible to produce a set of identical valves which permit the passage of fluid at different pressure values.

This result was obtained by having the bush 15 screwed into the first seat 13. By screwing the bush in or out, therefore, the spring 19 will be more or less compressed, and consequently will increase or decrease the forces exerted by the head 18 on the sealing rim 20, so that the head will tend to be displaced at a different value of the pressure of the fluid contained in the inlet duct.

In this way, this invention achieves the proposed object.

I claim:
1. A valve, comprising:
   (a) a housing having an inlet, an outlet and a chamber located between the inlet and the outlet;
   (b) a valve member mounted in the chamber for movement about a valve axis between open and closed positions in which fluid flow from the inlet to the outlet is permitted and blocked, respectively, said valve member having a first internal passage extending linearly along a first axis through the valve member in a direction substantially perpendicularly to the valve axis and being aligned with the inlet and the outlet in the open position, said valve member also having a second internal passage extending between opposite end regions linearly along a second axis through the valve member in a direction substantially perpendicularly to the valve axis and the first axis and being aligned with the inlet and the outlet in the closed position, said first and secone axes lying in a common plane;
   (c) means for moving the valve member from the open to the closed position; and
   (d) pressure relief means mounted in the second internal passage for resisting sudden pressure fluctuations in the fluid flow during movement from the open to the closed position, including a support mounted at one of said end regions of the second internal passage, a piston mounted on the support for sliding movement along the second axis, and having a head, and biasing means for constantly urging the head with a biasing force into engagement with the other of said end regions of the second internal passage.

2. The valve according to claim 1, wherein the valve member has a generally spherical shape, and wherein the first and second internal passages extend along diametrical axes.

3. The valve according to claim 1, wherein the support is threadedly mounted at said one end region for movement along the second axis to adjust the biasing force, and wherein the biasing means is a spring extending between the threaded support and the head.

4. The valve according to claim 3, wherein the spring is a helical spring.

5. The valve according to claim 1, wherein the support has an outer polygonal periphery bounding apertures with the valve member.

6. The valve according to claim 1, wherein the head has a frusto-conical outer surface.

7. The valve according to claim 1, wherein the head is constituted of an elastomeric material.

* * * * *